March 5, 1929.  A. H. COALE  1,704,175

PAN AND TRAY

Filed July 11, 1928  2 Sheets-Sheet 1

INVENTOR
Asa H. Coale

WITNESS
F. J. Hartman

BY Alston P. Moulton
ATTORNEY

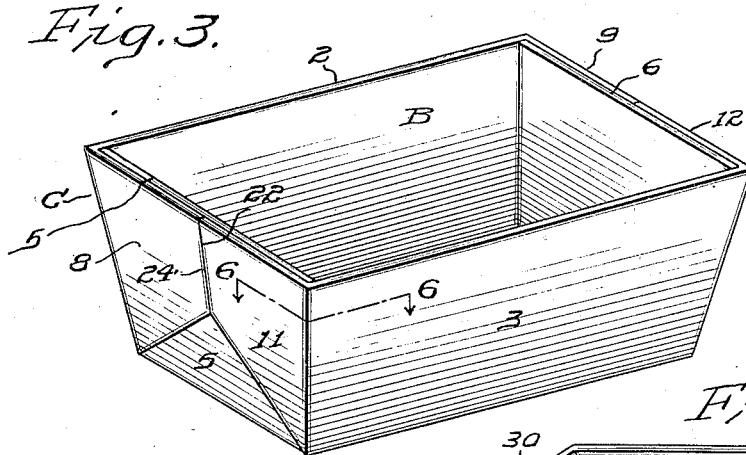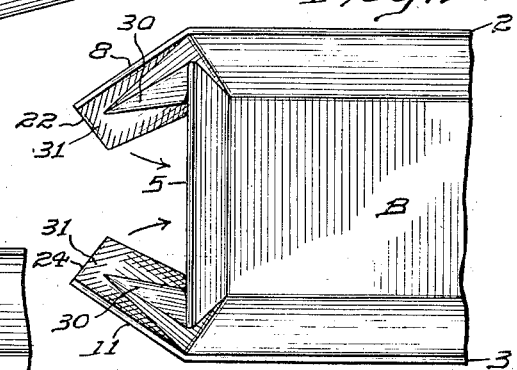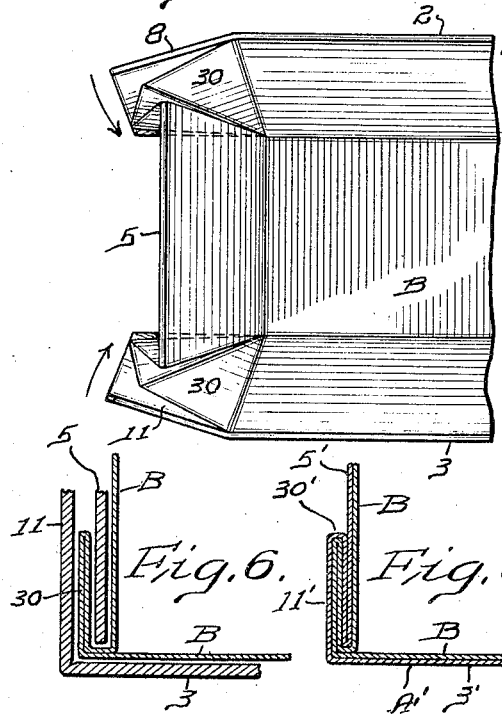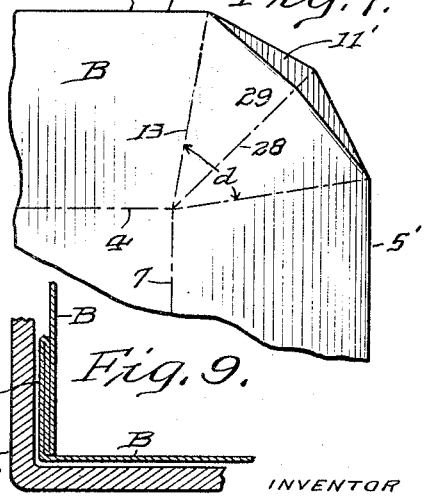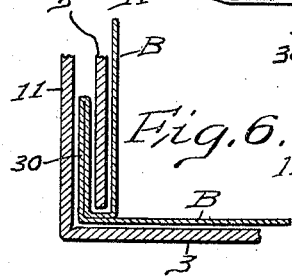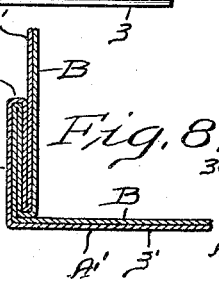

Patented Mar. 5, 1929.

1,704,175

UNITED STATES PATENT OFFICE.

ASA E. COALE, OF PHILADELPHIA, PENNSYLVANIA.

PAN AND TRAY.

Application filed July 11, 1928. Serial No. 291,807.

My invention relates to pans and trays and the method of making the same, and more particularly to pans or trays composed, in the main, of cardboard or heavy paper and provided with a lining which is impervious to hot greases and which does not chemically react with meat products which may be packed therein.

Heretofore such meat products as Philadelphia scrapple, jelly tongue, souse and head cheese have been supplied to the trade in tin pans or tin trays, (sheet iron coated with tin). Such meat products must be placed in the trays while the product is still hot. The pans are usually filled to a level of about a half an inch from the top edge of the pan. In cooling, the hot greases or jellies solidify and form a layer of solid grease or jelly completely covering and sealing the entire top surface of the contents of the pan. In this manner the meat is practically sealed air-tight until it is sold to the consumer, or until a portion is cut off for sale.

But these tin pans or trays are an expensive item in the packaging of these goods, for in many places the health authorities forbid the repacking of the tins with similar products. So far as the packing of these particular food products is concerned, the tins are thrown away after having been used once.

Moreover, the materials available for the purpose of packing these meat products are very few. Tin and aluminum are the only metals approved by the health authorities and available for the purpose, which are not affected by and do not affect the products themselves on standing in contact therewith. Glass jars or glass pans are, of course, suitable, so far as these properties are concerned, but these are easily broken and are relatively expensive.

Moreover, these food products are very difficult to package in anything but metal. The oils and greases penetrate and pass through ordinary grease-proof paper and metal is practically the only material which can be used and through which the greases will not pass. But the sheet of metal must be imperforate. If there is any break or rupture or puncture in the sheet, the greases will slowly pass therethrough, soiling whatever with which they come into contact. Moreover such exposure to air causes the pack to deteriorate rapidly. But my invention contemplates the use of any material in sheet form, flexible and foldable without breaking, and impervious to the greases of hot meat products.

It is one of the objects of my invention to provide a tray or pan, made of cardboard or heavy paper, with a liner of tin foil or aluminum foil or any other thin sheet material which is impervious to hot greases, the liner being folded into the shape of a tray with outwardly upwardly diverging opposite sides, and without cutting or rupturing or puncturing the foil, so that an impervious lining of foil or similar material covers the entire inner surface of the side walls and bottom of the pan to a point above the pack with the result that the food comes in contact with nothing of the pan except the tin or aluminum liner comprising a continuous imperforate sheet of tin or aluminum foil which is impervious to the greases above mentioned.

A further object of my invention is to substantially reduce the cost of the pans or trays within which are packed the food products above mentioned so that they may be thrown away when once emptied, without entailing the loss incident to the throwing away of tin pans or tin trays as has heretofore been done, because, under the rules of food commissioners, such tins may not be re-packed with similar products.

A further object of my invention is to so fold a blank of foil that it is not necessary to cut, puncture or rupture it within the boundaries formed by the edges of the blank and to make thereof a pan or tray of tin foil of the size and shape of the two pound tin pans now used for the purpose, and to stiffen, strengthen and hold said foil pan by an outer shell or pan of non-metallic material, such as cardboard, molded board, paper and the like.

Other objects of my invention will appear in the specification and claims below.

In the drawing forming a part of this specification, Fig. 1 is a plan view of a stiff cardboard blank for forming the shell of my improved pan, the shaded areas indicating where the adhesive is preferably applied thereto.

Fig. 3 is a perspective view of the completed pan.

Figs. 4 and 5 are plan views of one end of the superposed blanks, showing progressively the manner of bending up the walls and of forming the pleats or folds in the liner.

Fig. 6 is a horizontal sectional view on the line 6—6 of Fig. 1 through a corner of the pan, but on a larger scale, and with the plies slightly spaced to clearly show the construction.

Fig. 7 is a fragmentary plan view of a corner of a modified blank for the shell, with the same liner as that shown in Fig. 2 in position thereon; and Fig. 8 is a horizontal sectional view, similar to Fig. 6, showing the completed corner when the sheets shown in Fig. 7 have been folded and the pan has been completed.

Fig. 9 illustrates a further modified construction, with the liner and shell separated for the sake of clearness.

Figure 1:
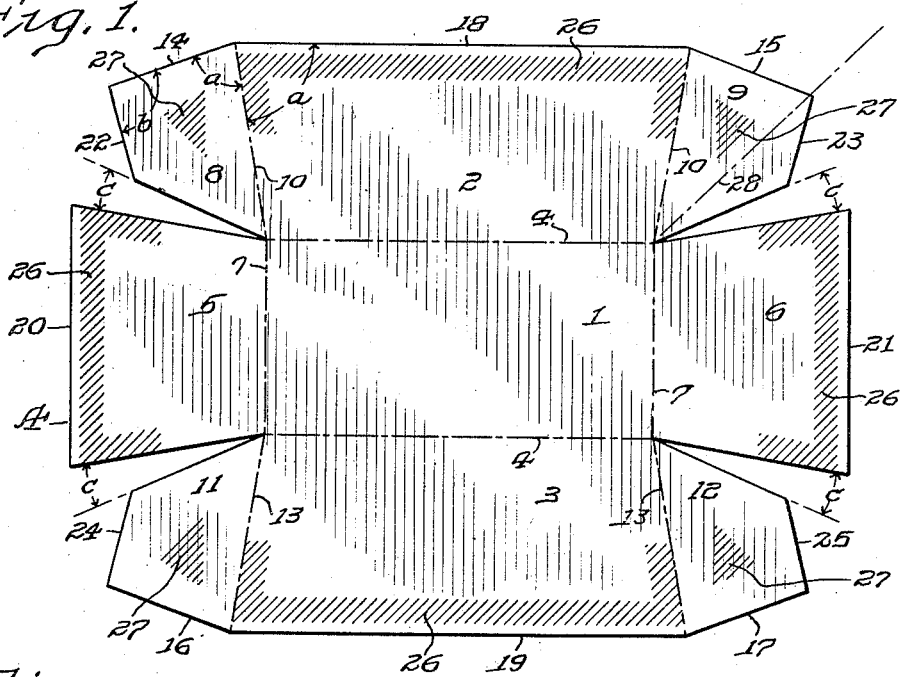

One method of forming a pan in accordance with my invention is by forming an integral blank A, of cardboard, or other non-metallic bendable material, such as is shown in Fig. 1 and which comprises a bottom wall section 1, side wall sections 2, 3 respectively, integrally connected to the opposite edges of the bottom wall section at the scoring lines 4, 4, and two end wall sections 5, 6 connected to the opposite ends of the bottom section 1 at the scoring lines 7, 7.

The side wall section 2 is provided at its opposite ends with flaps 8, 9 respectively and connected to the side wall section 2 at the scoring lines 10, 10 respectively. The other side wall 3 is similarly provided with two flaps 11, 12 connected to the side wall section 3 at the scoring lines 13, 13.

The bottom 1 is substantially rectangular as indicated by the scoring lines 4—4, 7—7, but the side edges of the side wall sections 2, 3 preferably diverge slightly as is indicated by the dot-and-dash lines 10—10, 13—13, and similarly the side edges of the end walls 5, 6 diverge outwardly slightly from their juncture with the lines 7—7 so that when the side and end wall sections are folded upwardly along the scoring lines 4—4, 7—7, the completed pan will have upwardly, outwardly tapering side and end walls as is shown in Fig. 3.

The outer edges 14, 15 of the flaps 8—9 and the outer edges 16—17 of the flaps 11—12 make like angles (a) with the scoring lines 10—10 and 13—13, respectively, and that angle is the same that the outer edges 18—19 of the sides 2—3, make respectively with the scoring lines 10—10, 13—13. The width of the flaps 8, 9, 10, 11 measured along their upper edges 14, 15, 16, 17 is respectively one-half that of the upper edge 20 or 21 of the end wall 5 or 6 respectively. The angles b at the end of the outer edge of each flap are preferably right angles, so that the ends 22 and 23 of flaps 8 and 11 respectively and the ends 24 and 25 of flaps 9 and 12 will substantially abut when the flaps are finally folded as shown in Fig. 3. The flaps 8, 9, 10, 11 are cut free from their adjacent end wall sections 5 and 6 so as to form acute re-entrant angles c therebetween, said angles being all alike and with their apexes at the corners of the bottom section 1 respectively. This blank A so formed is the blank out of which is formed the shell or main supporting portion of the finished pan. The outer edges 18, 19 of the side wall sections 2, 3 of the blank are parallel to each other and to the scorings 4, 4, forming the bottom section 1. Similarly, the outer edges 20, 21 of the end sections 5 and 6 are parallel to the scorings 7—7 of the bottom of the blank.

Figure 2:
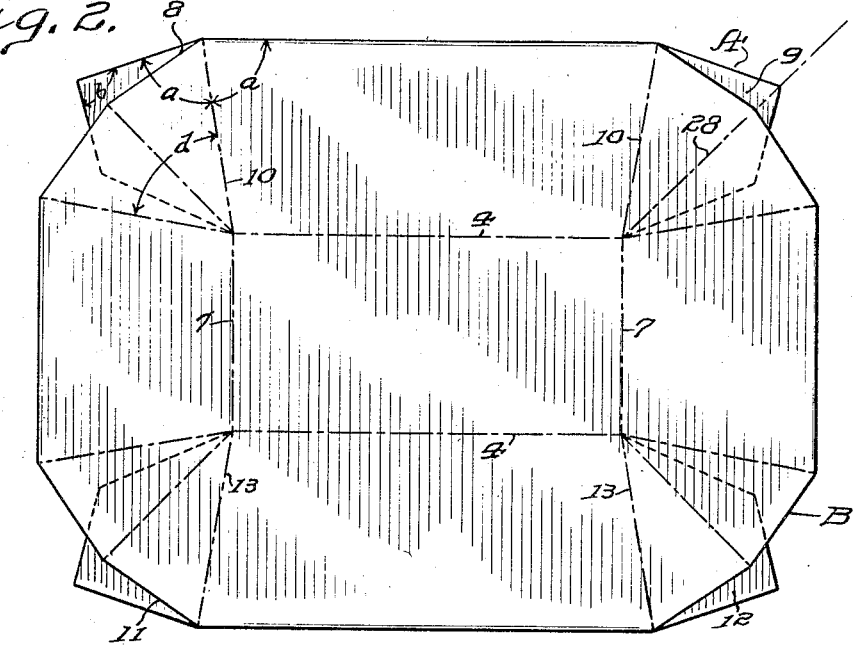
Fig. 2 is a plan view of the same blank with a liner sheet superposed thereon.

The blank having thus been formed preferably of cardboard, stiff enough to form a rigid tray, I then place thereon an imperforate sheet B of tin or aluminum foil in the manner indicated in Fig. 2. The edges of this sheet of foil may be and preferably are coincident with the outer edges 20, 21 of the end wall sections 5 and 6 and coincident with the outer edges 18, 19 of the side wall sections 2 and 3.

Before placing this foil B on the blank, I may, and preferably do apply to the blank 1, stripes 26 of adhesive, along the edges 18 and 19 of the sides 2, 3 and extending preferably a short distance inwardly adjacent the scoring 10—10, 13—13 and also extending along the edges 20, 21 and inwardly on the side edges of the end flaps 5, 6. I also preferably apply a spot 27 of adhesive on each flap 8, 9, 11 and 12 respectively, but not beyond a line 28 bisecting the angles d between the scorings at the ends of the side portions and the adjacent edge of the adjacent end flap. As a matter of fact, these spots 27 on the end flaps 8, 9, 11 and 12 may be omitted without interfering with the formation of the pan. By these stripes and spots of adhesive 23, 24 the foil B is securely attached to the blank A. In forming the sheet of foil the distance from the corner of the bottom to the edge of the foil measured along the line 28 may be a little less than the height of the walls of the pan, but the difference should not be more than the distance that the top surface of the pack is below the top edge of the pan or tray, thereby making the entire upper edge of the foil, in the finished tray above the upper surface of the contents of the tray. When the tray is "filled" the upper surface of the sealing layer of grease or jelly must be below the upper edge of the liner or foil.

The two sheets or blanks A, B now being secured together, the parts may be folded upwardly to form the pan shown in Fig. 3. Two positions of the sides, ends and foil in the formation of the pan are indicated in Figs. 4 and 5. In Fig. 4, the folding has just commenced. In Fig. 5 it is nearly completed. Care is taken to begin to move the end walls 5, 6 upwardly an instant before the upward movement of the side wall portions 2, 3 is started, to insure the formation in the substantially triangular portion 29 of the foil provided by the lines forming the angles d, of a triangular fold 30 in the foil B outside of the end walls 5 and 6. Thus, in Fig. 4 the end wall 5 has been lifted slightly faster than the sides 5—6 and half of the triangular portions 29—29 lying between the adhesive on the flaps 8 and 11 and that on the adjacent edges of the end wall 5 has been bent or flexed rearwardly of the end wall 5 as shown in Fig. 4 to start to form the triangular fold or pleat 30 in the foil on the bisecting lines 28 shown in Figs. 1 and 2. When the end walls have nearly reached the limit of their motion upwardly as shown in Fig. 5, this bend in the foil will have substantially straightened out, as shown in Fig. 5, and then as the end flaps 8 and 11 are turned toward each other around the scorings 10 and 13 respectively, as indicated by the arrows Figs. 4 and 5, the said triangular pleat or fold 30 will be formed in the foil, which pleat or fold 30 will be pressed flat between the outer surface of the end walls 5 and 6 and the inner surface of the end flaps 8 and 11 when the tray is completely folded. It is to be understood that the end walls 5 and 6, and the side walls 2 and 3 are folded upwardly simultaneously. Just before or during the bending inwardly on the side flaps 8 and 11, 9 and 12, a stripe 31 of suitable glue or cement may be applied to the flaps 8, 9, 11, 12 along the free edges 22, 23, 24 and 25, as shown in Fig. 5, so that when the said end flaps are pressed firmly against the outer surfaces of the end walls 5 and 6 and held there they will adhere thereto and hold the pan in the form in which it has been folded with the triangular fold or pleat 30 of foil firmly held between the end walls and the end flaps. In Fig. 6 is shown a horizontal section of a corner of the pan or tray C with the flap 11 and end wall 5 slightly spaced from the fold 30 of the foil for the sake of clearness. This forming of the triangular fold 30 is readily effected without breaking or puncturing or tearing the foil, for the foil is not stretched over and around an edge of other flexible material in forming my preferred form of tray. The bend in the foil is always toward the foil, not towards the backing or shell. The foil being folded is subjected to no tearing force and is merely pressed flat and held clamped between the end walls and the flaps after it has been gently folded and when completed, the cardboard pan will be provided with a continuous impervious imperforate lining of foil B, folded to conform to the shape of the interior of the shell or tapered pan so made and permanently secured or secured against removability to the shell formed by the bottom and walls of the cardboard blank.

The foil, which I prefer to use, is of aluminum, tin, or other thin flexible material, impervious to hot greases, and to distinguish such foils or thin sheets from those of lead or other impervious materials, for the purpose of this description, I have termed them "neutral" foils as they are not affected by and do not chemically react with the meat products which may be packed in the pan for placing the product on the market. The pans C so made of cardboard and having a neutral foil lining will be amply rigid and firm to withstand the handling to which the package is usually subjected. The pan C is as serviceable as a tin pan, and the liner therefor is made of a single sheet of tin, aluminum or other impervious flexible neutral material, too thin and light to withstand of itself the treatment incident to packing and shipping. This pan C will seal hermetically five of the six sides of the cake or brick of meat products. When a coating of solidified grease, which may come from the contents of the package, is formed on the upper or top surface of the meat or scrapple cake or brick, this solidified layer of grease serves to seal the top side of the cake or brick of meat product from the atmosphere.

The entire surfaces of the pleats or folds will be so tightly pressed throughout their entire area between the walls and the flaps, each flap being secured against removability to the wall to which it is hinged and to the wall to which it is adhesively secured, that the greases and fluid contents of the pan cannot flow into the folds and exert any substantial pressure on the inner surfaces of the folds thereby tending to rupture the relatively weak foil where it is not strengthened by being adhesively secured to the shell. Moreover, the pressure of the soft mobile contents of the pan on the inner sides of the end walls 5 and 6 tends to press said end walls outwardly firmly against the flaps 14, 15, 16 and 17 and thus hold the plies or folds of the folds or pleats tightly pressed together, thereby also preventing the ingress of the contents of the pan between the inner surfaces of the pleats or folds.

In Figs. 7 and 8 I have indicated a slightly modified manner of forming a pan with an integral impervious and imperforate foil lining. With some products, the cake or brick when cool, solidifies sufficiently to retain its form and shape and in such cases, it may not be necessary to use a thick cardboard, such as I have indicated in Figs. 1 to 6. A thin flexible sheet of tough paper may be used as the blank A'. In this case the foil and paper are folded simultaneously alike. The paper and foil are folded precisely as the foil was folded as above described, and the shape of the paper blank is similar to that of the foil blank. The folding of the end walls (see wall 5' Fig. 7) is first started and then the side walls (exemplified in the wall 2 in Fig. 7) are moved upwardly around the scorings 4 and 7 forming the bottom portions, if scorings are necessary. In this case, both the paper blank A' and the foil B will be folded exactly as the foil is folded. The triangular pleat 30' will be formed in a double or duplex sheet instead of in foil alone. But the foil will be folded precisely as it was folded in the pan shown in Figs. 1 to 6 and that without rupturing or perforating the foil so that the foil of the completed tray is intact and will prevent the passage therethrough of the greasy contents of the package. Before the flaps (exemplified in flap 11' in Fig. 8) are pressed adjacent the ends (exemplified in end 5' in Fig. 8), a stripe of glue may be applied to the flaps or to the ends of the pan to be covered by the flaps.

In Fig. 9 is indicated a still further modification wherein the outer shell or casing A² may be made integral as of wood or pressed papier-mâché or some other material not readily bent or folded. The foil B, however, is folded up by itself exactly as it was folded in forming the tray shown in Figs. 1 to 5. The foil is folded into a tin or aluminum liner of exactly the same size and shape as the interior of the shell A² and may be slipped into the shell and secured thereto by adhesive previously applied to the shell in any approved manner. In Fig. 9 the liner B and shell A² are spaced for the sake of showing the construction clearly.

It is to be understood that when the trays or pans are made in a machine constructed for the purpose of making such pans, there may be no scoring lines on the blank before folding, particularly if the non-metallic shell be of paper, in which case the dot-and-dash scoring lines in the drawing may be regarded as indicating where the bend in the sheet is to be formed.

Having thus described my invention, what I claim and desire to protect by Letters Patent of the United States is:

1. A pan for the packing of meat products hot therein and comprising a paper outer shell and a liner of thin sheet material, impervious to hot greases and without cut, perforation or passage through which the hot contents may pass to the outside of the liner when said pan is filled with hot meat products and lying against the inner surfaces of said shell, said shell comprising a flat bottom and upwardly extending walls, one wall being provided with a flap connected to the edge thereof and adhesively secured flat against the outside of the adjacent wall to form a corner into which said adjacent wall fits with its edge substantially abutting against said wall having a flap, said thin sheet material being secured to said shell against removability and being provided at each corner of the shell with a pleat which passes between said abutting edge and the said wall which has a flap, said pleat being held tightly pressed flat between said wall having an abutting edge and the said flap secured thereto by the pressure of the contents of said pan when filled.

2. A pan for the packing of meat products hot therein and comprising a paper outer shell and a liner of thin neutral sheet material impervious to greases, without cut, perforation or passage through which hot greases may pass to the outside of said liner, said sheet material being secured to said shell against removability and lying against and covering substantially the entire inner surface of said shell, said shell comprising a flat bottom and upwardly extending walls of stiff paper material, one wall of an adjacent pair of walls forming a corner of the shell being provided with a flap secured against removability flat against the other wall of said pair of walls, said sheet material being provided with a fold or pleat the entire outer surfaces of which are held tightly pressed flat between said flap and the wall to which said flap is secured against removability to prevent the contents of said pan from flowing into said fold and exerting any substantial pressure against the inner surfaces of said pleat or fold.

3. A pan for the packing of meat products hot therein and comprising a paper outer shell and a liner of thin sheet material, impervious to hot greases, without cut, perforation or passage through which the hot contents may pass to the outside of said liner, when said pan is filled with hot meat products, said shell comprising a flat bottom and upwardly extending walls blanked out of stiff paper material and secured together at their corners, said sheet material being secured to said shell against removability at the upper edges of said sheet material and being provided with a fold or pleat extending outwardly between the adjacent edges of each pair of adjoining walls, and relatively stiff means to cover said pleat, and to tightly hold one entire outer surface of said pleat pressed flat against the outer side of one of an adjacent pair of walls to prevent the contents of said pan from flowing into said fold and exerting any substantial pressure against the inner surfaces of said pleat or fold, said means being secured against removability to both of said adjoining walls.

4. A pan for the packing of meat products hot therein, comprising a stiff paper outer shell and a liner of thin sheet material, impervious to hot greases and without cut, perforation or passage through which the hot contents of said pan may pass to the outside of said liner when said pan is filled with hot meat products, said liner lying against and covering substantially the entire inner surfaces of said shell, said shell comprising a flat bottom and upwardly extending walls, one wall of an adjacent pair of walls which form a corner of the shell being provided with a flap which is secured against removability to the outside of the other wall of said pair of walls, said liner being secured against removability to the walls along the upper edges of said liner and being provided at each corner of said shell with a fold or pleat which is tightly pressed flat between said flap and the outer surface of the wall to which said flap is secured against removability, the outer side of said fold or pleat being adhesively secured to the inner surface of said flap.

5. A pan for the packing of meat products hot therein, comprising a stiff paper outer shell and a liner of thin sheet material, impervious to and which does not chemically react with hot greases and without cut, perforation or passage through which the hot contents of said pan may pass to the outside of said liner when said pan is filled with hot meat products, said liner lying against and covering substantially the entire inner surfaces of said shell, said shell comprising a flat bottom and upwardly extending walls of said paper material, one wall of an adjacent pair of walls which form a corner of the shell being provided with a flap which is secured against removability to the outside of the other wall of said pair of walls, said liner being also secured to said walls along the upper edges of said liner against removability and being provided at said corner of said shell with a fold or pleat the entire outer surfaces of which are held tightly pressed flat between said flap and the outer surfaces of the wall to which said flap is secured against removability, to prevent the contents of said pan from flowing into said fold and exerting any substantial pressure against the inner surfaces of said pleat or fold.

In witness whereof, I have hereunto set my hand this tenth day of July, 1928.

ASA H. COALE.